Jan. 22, 1963 M. C. ROBINSON 3,074,513
SPRAG LOCK STRUCTURE
Filed July 7, 1959
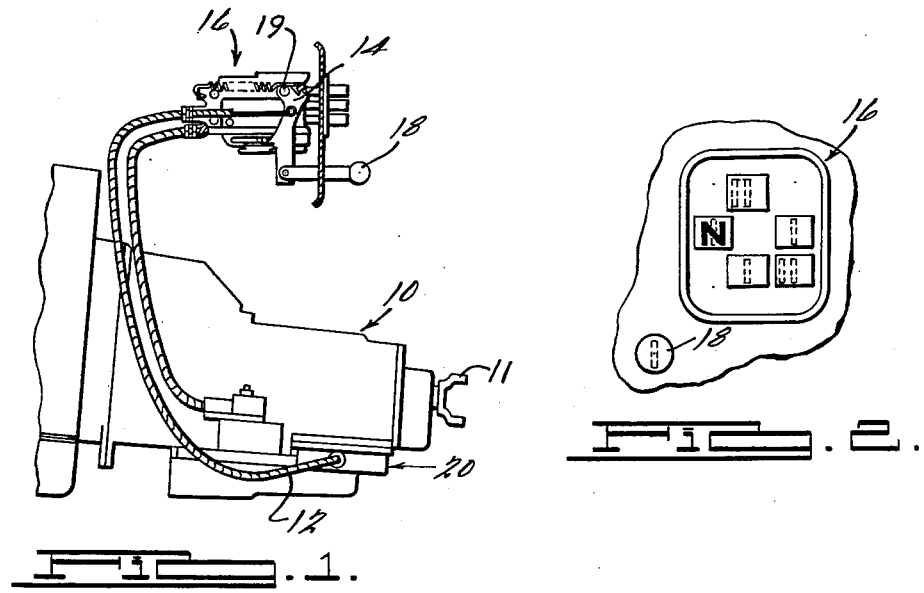
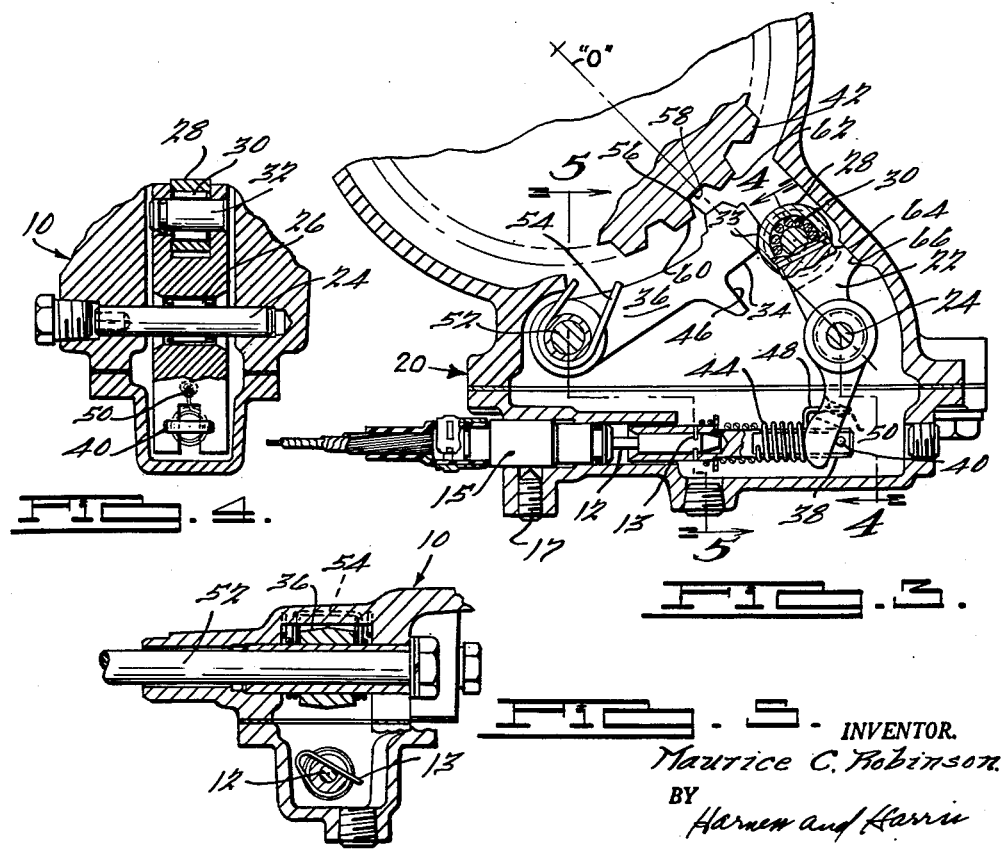
INVENTOR.
Maurice C. Robinson.
BY Harness and Harris
ATTORNEYS.

United States Patent Office 3,074,513
Patented Jan. 22, 1963

3,074,513
SPRAG LOCK STRUCTURE
Maurice C. Robinson, Royal Oak, Mich., assignor to Chrysler Corporation, Highland Park, Mich., a corporation of Delaware
Filed July 7, 1959, Ser. No. 825,582
3 Claims. (Cl. 188—69)

This invention relates to improvements in sprag lock structure for use in preventing rotative movement of gear structures and, in particular, the output gearing of automotive transmissions.

In conveyances such as automobiles, trucks, and other types of land vehicles, it is often desirable to provide some means for positively locking the vehicle wheels against movement so as to prevent uncontrolled motion of the vehicle. For example, when a vehicle is parked, particularly on hills, the static condition of the transmission, drive shaft and engine may not suffice to prevent movement of the vehicle even though the hand brake is engaged if the angle of the vehicle on the hill is sufficiently great.

The present invention concerns a pivotally operated lever type of sprag which is adapted to be pivoted into engagement with the teeth of a parking gear operatively connected to the transmission output shaft to thereby prevent any possible movement of the drive shaft and vehicle wheels. A feature of this parking sprag structure is that it is resiliently urged into contact with the gearing, and it is only when an overcentered position of the sprag structure occurs that a positive locking of the gearing is accomplished. This feature is of importance in applicant's structure because of the presence of a second feature which, through a camming action, prevents the parking sprag from engaging positively with the gear until a substantially stationary position of the gear is attained. It will be obvious from the discussion below that these two features cooperate to produce a parking sprag structure which prevents chipping and other frictional wearing of the parking gear and the sprag structure itself.

It is a principal object of this invention to provide an improved parking sprag structure which prevents positive engagement of the sprag with the gearing until the gearing is substantially at rest.

A specific object of this invention is to provide the above parking sprag structure with overcentering features to provide a positive lock.

Further objects and advantages of the present invention become apparent from the following description and drawings, in which FIGURE 1 represents a side elevational view of a transmission and push-button actuating mechanism therefor.

FIGURE 2 represents a front view of a push button actuating mechanism of FIGURE 1.

FIGURE 3 represents a cross-sectional view of the parking sprag structure of the transmission of FIGURE 1.

FIGURE 4 represents a cross-sectional view of the sprag actuating arm structure of FIGURE 3 taken on the line 4—4 thereof in the direction of the arrow.

FIGURE 5 represents a cross-sectional view of the sprag mounting and actuating structure of FIGURE 3 taken along the line 5—5 thereof in the direction of the arrow.

Referring to FIGURE 1, a transmission designated 10 having a rotatable output shaft 11 is provided with a sprag actuating cable 12, which is operatively connected to a sprag operating lever 14 pivotally connected to the push-button control unit 16. Lever 14 is actuated by means of a member 18, which is selectively moved to the right and to the left in FIGURE 1 to selectively release the sprag or apply the sprag, respectively. Cable 12 is provided with a spring snap connection 13 which connects end 38 to cable 12. Cable 12 slides in bearing 15 secured in section 20 of the transmission housing by a set screw 17.

Referring to FIGURES 3 and 4, it is seen that the sprag mechanism contained in portion 20 of the transmission housing comprises actuating arm 22 pivotally mounted on a shaft 24 which is secured on opposite sides of the transmission housing 10 and is provided with needle bearings 26 to provide relatively frictionless pivotal movement of the sprag actuating arm. The upper portion of arm 22 is bifurcated to receive a contacting wheel or cam follower 28, which is formed of the outer race of a needle bearing 30 mounted on a shaft 32 secured in the sides of the bifurcated upper portion of the actuating arm 22. This contacting cam wheel 28 provides relatively frictionless contact with the bearing portion or cam surface 34 of the sprag arm 36. The lower end of sprag actuating arm 22 is also bifurcated and receives the end 38 of the actuating cable 12. A pin 40 is provided in the end 38 of the cable to cause the sprag actuating arm to be pivoted out of engagement with the bearing surface 34 of the sprag arm when it is desired to release the sprag arm from the parking gear 42. The spring 44 on the cable 12 urges the lower portion of actuating arm 22 into contact with pin 40 at all times other than when the cable 12 is moved so far to the right that the wheel 28 bears against the stop 46 of the sprag arm 36. In this position pin 40 slightly overrides the lower end of the arm 22. An end projection 48 of spring 44 is inserted in aperture 50 in the sprag actuating arm to maintain the actuating arm, the cable, and the spring in proper relationship.

The sprag arm 36 is pivotally mounted on a shaft 52 secured to opposite sides of the transmission housing 10 and is constantly urged into contact with the wheel 28 by means of an anti-bounce spring 54 which prevents motion of the vehicle from causing engagement of the sprag arm with the parking gear.

In operation of the parking sprag structure, it is seen that the movement of the lever 14 of the push-button unit 16 in a clockwise direction around its pivot point 19 in FIGURE 1 will move end 38 of cable 12 to the right in FIGURE 3 to cause spring 44 on the cable to be urged against the lower portion of the sprag actuating arm 22 and thereby cause the wheel 28 to ride up ramp 33 and on to the bearing surface 34 of the sprag arm 36. As this occurs the tooth 56 on the sprag arm will be inserted into the tooth recess 58 in gear 42 and will be locked in position therein when the wheel 28 moves along the bearing surface 34 so far to the left in FIGURE 3 that the center axis of the wheel 28 will become overcentered to the left with respect to the right angle relationship between bearing surface 34 and pivot point 24 of the sprag actuating arm. The right angle line through the bearing surface 34 and pivot 24 when the tooth 56 is substantially within recess 58 is represented by "O" in FIGURE 3. It is noted that any movement of the gear 42 during the time that the tooth 56 is being inserted into the recess 58 will cause engagement of the side portions of the tooth 56 and the cooperating teeth 60 or 62 of the gear depending upon the direction of movement of the parking gear and by a camming action between these teeth portions, the sprag arm 36 will be urged downwardly to urge sprag actuating arm 22 in a clockwise direction to compress spring 44. It is only then when the force of spring 44 overcomes the camming force of the gear teeth on the sprag arm tooth 56 that positive locking engagement of the sprag arm in the parking gear can occur. In this manner, the mechanical force on the parking sprag structure and the parking gear is limited to a value which will not cause damage to either. The projection 64 on the sprag actuating arm bears against the portion 66 of the transmission housing when the sprag actuating arm is pivoted in a clockwise direction to prevent damage to the needle bearing 30 and transmission housing.

I claim:
1. In a sprag brake mechanism, a support, a rotatable shaft journalled on said support having a locking gear fixed thereto, a toothed locking sprag pivotally mounted on said support on an axis substantially parallel to said shaft for movement of the sprag toothed portion into and out of locking engagement with the locking gear, a first resilient means continuously urging said locking sprag out of engagement with said locking gear, an actuator for effecting pivotal movement of said locking sprag into engagement with said locking gear comprising a pivotally mounted lever journalled on said support having a cam roller follower portion therein arranged to be engageable with a cam portion formed on said locking sprag to effect pivotal movement of said locking sprag into engagement with said locking gear when said lever is pivoted in one direction, and control means connected to and arranged to effect pivotal movement of said actuator lever, said actuator pivot axis being so arranged with respect to the locking gear axis and the locking sprag toothed portion that the roller follower portion of the actuator engaged with the cam portion of the sprag moves to an overcenter position with respect to a line connecting the shaft pivot axis and the lever pivot axis when the sprag lockingly engages the gear, and cooperating camming portions on said gear and sprag teeth acting to produce a force to cam said sprag out of engagement with said gear when the gear is rotating relative to the sprag, said control means including a second resilient means for transmitting the force for actuation of the actuator lever to a position to initiate locking engagement of said gear and sprag prior to actual locking engagement of said gear and sprag with said second resilient means preloading said sprag to effect actual locking engagement when the tooth camming force is overcome.

2. In a sprag brake mechanism, a support, a rotatable shaft journalled on said support having a locking gear fixed thereto, a toothed locking sprag pivotally mounted on said support on an axis substantially parallel to said shaft for movement of the sprag toothed portion into and out of locking engagement with the locking gear, a first resilient means continuously urging said locking sprag out of engagement with said locking gear, an actuator for effecting pivotal movement of said locking sprag into engagement with said locking gear comprising a pivotally mounted lever on said support having a cam roller follower portion therein arranged to be engagable with a cam portion formed on said locking sprag to effect pivotal movement of said locking sprag into engagement with said locking gear when said lever is pivoted in one direction, and control means connected to and arranged to effect pivotal movement of said actuator lever, said actuator pivot axis being so arranged with respect to the locking gear axis and the locking sprag toothed portion that the follower portion of the actuator moves to an overcenter position with respect to a line connecting the shaft axis to the lever pivot axis when the sprag lockingly engages the gear and cooperating camming portions on said gear and sprag teeth acting to produce a force to cam said sprag out of engagement with said gear when the gear is rotating relative to the sprag, said control means including a second resilient means for transmitting the force for actuation of the actuator lever to a position to initiate locking engagement of said gear and sprag prior to actual locking engagement of said gear and sprag with said second resilient means preloading said sprag to effect actual locking engagement when the tooth camming force is overcome, said sprag having a stop means adjacent one end of its cam portion to limit the overcenter movement of the actuator follower portion.

3. In a sprag brake mechanism, a support, a rotatable shaft journalled or said support having a locking gear fixed thereto, a toothed locking sprag pivotally mounted on said support on an axis substantially parallel to said shaft for movement of the sprag toothed portion into and out of locking engagement with the locking gear, a first resilient means continuously urging said locking sprag out of engagement with said locking gear, an actuator for effecting pivotal movement of said locking sprag into engagement with said locking gear comprising a pivotally mounted lever journalled on said support on an axis parallel to said shaft having a cam roller follower thereon arranged to be engageable with a cam portion formed on said locking sprag to effect pivotal movement of said locking sprag into engagement with said locking gear when said lever is pivoted in one direction, and control means connected to and arranged to effect pivotal movement of said actuator lever, said actuator lever pivot axis being parallelly arranged with respect to the locking gear axis and as related to the locking position of the sprag toothed portion that the roller follower of the actuator moves to an overcenter position with respect to a line connecting the shaft axis and the lever pivot axis when the sprag lockingly engages the gear, and cooperating camming portions on said gear and sprag teeth acting to produce a force to cam sprag out of engagement with said gear when the gear is rotating relative to the sprag, said control means including a second resilient means for transmitting the force for actuation of the actuator lever to a position to initiate locking engagement of said gear and sprag prior to actual locking engagement of said gear and sprag with said second resilient means preloading said sprag to effect actual locking engagement when the tooth camming force is overcome.

References Cited in the file of this patent
UNITED STATES PATENTS

| 1,216,822 | McCloud | Feb. 20, 1917 |
| 2,670,064 | Hasbany | Feb. 23, 1954 |
| 2,689,029 | McFarland | Sept. 14, 1954 |
| 2,709,504 | Mamo | May 31, 1955 |
| 2,770,326 | Wayman | Nov. 13, 1956 |
| 2,814,361 | Schmidt | Nov. 26, 1957 |
| 2,860,731 | Hause | Nov. 18, 1958 |
| 2,875,856 | Mrlik | Mar. 3, 1959 |
| 2,912,085 | De Lorean | Nov. 10, 1959 |
| 2,954,103 | Sand | Sept. 27, 1960 |
| 2,964,135 | Sand | Dec. 13, 1960 |